US010691616B1

(12) United States Patent
Shveidel et al.

(10) Patent No.: US 10,691,616 B1
(45) Date of Patent: Jun. 23, 2020

(54) SAFE BUFFER TRANSFER MECHANISM IN A DISTRIBUTED STORAGE SYSTEM

(71) Applicant: EMC IP Holding Company LLC, Hopkinton, MA (US)

(72) Inventors: Vladimir Shveidel, Pardes-Hana (IL); Lior Kamran, Rishon LeZion (IL)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/260,355

(22) Filed: Jan. 29, 2019

(51) Int. Cl.
| | |
|---|---|
| *G06F 12/10* | (2016.01) |
| *G06F 12/126* | (2016.01) |
| *G06F 12/0804* | (2016.01) |
| *G06F 9/50* | (2006.01) |
| *G06F 9/54* | (2006.01) |

(52) U.S. Cl.
CPC .......... *G06F 12/126* (2013.01); *G06F 9/5077* (2013.01); *G06F 9/544* (2013.01); *G06F 9/547* (2013.01); *G06F 12/0804* (2013.01)

(58) Field of Classification Search
CPC ............................ G06F 12/126; G06F 12/0804
USPC ........................................................ 711/159
See application file for complete search history.

(56) References Cited

U.S. PATENT DOCUMENTS

| | | | | |
|---|---|---|---|---|
| 6,078,337 A | * | 6/2000 | Fukui | .................. G06F 12/0813 345/505 |
| 2009/0182960 A1 | * | 7/2009 | Crockett | ............. G06F 11/2074 711/162 |

* cited by examiner

*Primary Examiner* — Jae U Yu
(74) *Attorney, Agent, or Firm* — Daly, Crowley Mofford & Durkee, LLP

(57) ABSTRACT

A method is provided for use in a distributed storage system having a write cache, the method comprising: receiving, by a first node in the distributed storage system, a first Remote Procedure Call (RPC) command to perform a partial update to a buffer that is stored in a memory of the first node, the partial update including replacing old data that is present in the buffer with new data that is stored in the write cache; transmitting, from the first node to a second node, a second RPC command instructing the second node to provide the new data to the first node by executing a Remote Direct Memory Access (RDMA) write operation into the memory of the first node; and performing the partial update based on the new data when the RDMA. write operation is completed and the new data is received by the first node as a result.

14 Claims, 9 Drawing Sheets

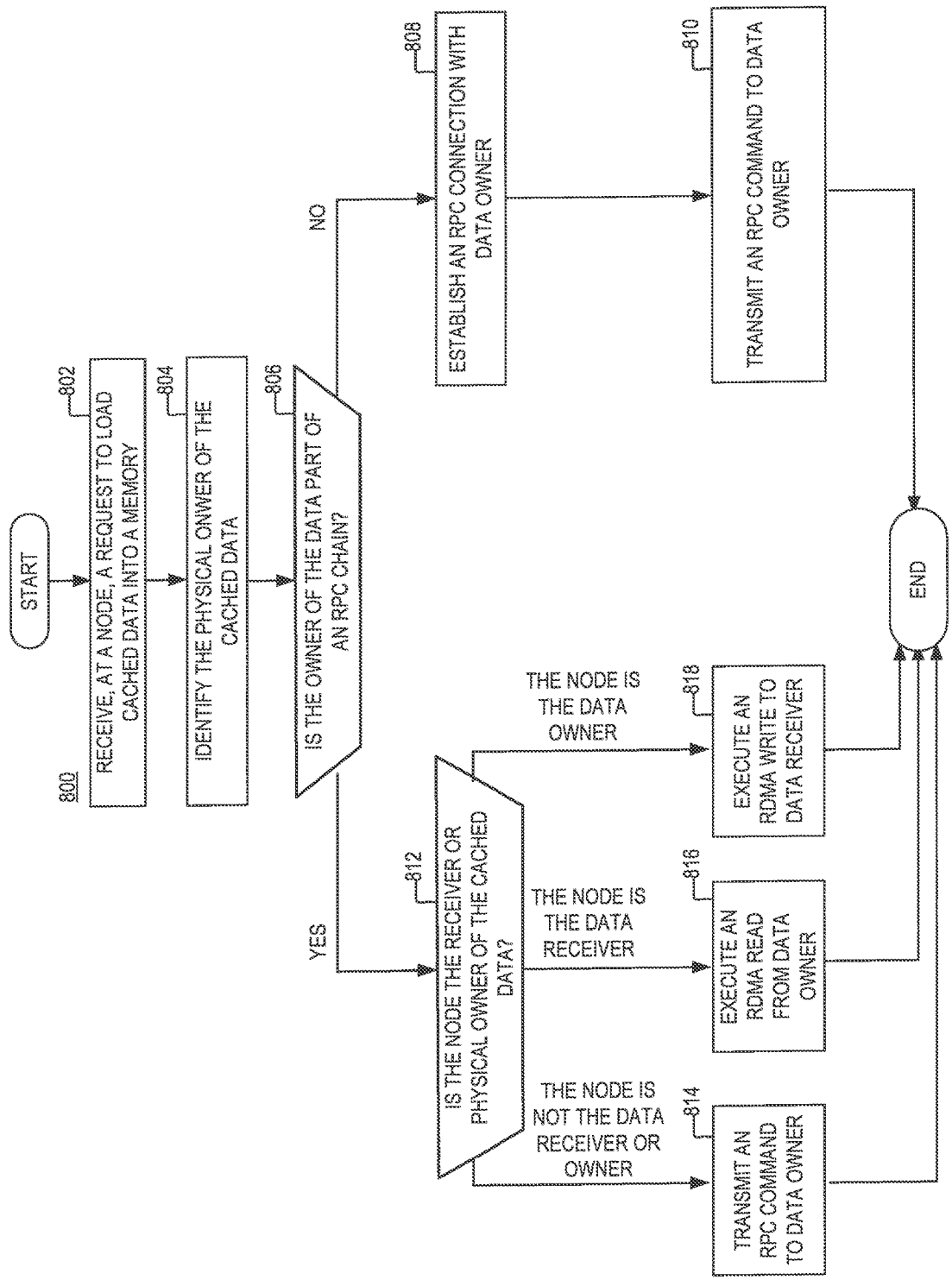

SAFE BUFFER TRANSFER MECHANISM IN A DISTRIBUTED STORAGE SYSTEM

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided for use in a distributed storage system having a write cache, the method comprising: receiving, by a first node in the distributed storage system, a first Remote Procedure Call (RPC) command to perform a partial update to a buffer that is stored in a memory of the first node, the partial update including replacing old data that is present in the buffer with new data that is stored in the write cache; transmitting, from the first node to a second node, a second RPC command instructing the second node to provide the new data to the first node by executing a Remote Direct Memory Access (RDMA) write operation into the memory of the first node; and performing the partial update of the buffer based on the new data when the RDMA write operation is completed and the new data is received by the first node as a result; wherein the second node is a physical owner of a cache entry in the write cache that includes the new data, and the second node is configured to store a copy of the new data in a memory of the second node.

According to aspects of the disclosure, a distributed storage system is provided comprising: a first node that is operatively coupled to a second node, wherein the first node is configured to perform the operations of: receiving a first Remote Procedure Call (RPC) command to perform a partial update to a buffer that is stored in a memory of the first node, the partial update including replacing old data that is present in the buffer with new data that is stored in a write cache of the distributed storage system; transmitting, to the second node, a second RPC command instructing the second node to provide the new data to the first node by executing a Remote Direct Memory Access (RDMA) write operation into the memory of the first node, the second node being a physical owner of a cache entry stored in the write cache that includes the new data, and the second node being configured to store a copy of the new data in a memory of the second node; and performing the partial update of the buffer based on the new data when the RDMA write operation is completed and the new data is received by the first node as a result.

According to aspects of the disclosure, a non-transitory computer readable medium is provided that stores one or more processor-executable instructions which when executed by one or more processors of a first node in a storage system cause the one or more processors to perform the operations of: receiving a first Remote Procedure Call (RPC) command to perform a partial update to a buffer that is stored in a memory of the first node, the partial update including replacing old data that is present in the buffer with new data that is stored in a write cache of the storage system; transmitting, to a second node in the storage system, a second RPC command instructing the second node to provide the new data to the first node by executing a Remote Direct Memory Access (RDMA) write operation into the memory of the first node, the second node being a physical owner of a cache entry stored in the write cache that includes the new data, and the second node being configured to store a copy of the new data in a memory of the second node; and performing the partial update of the buffer based on the new data when the RDMA write operation is completed and the new data is received by the first node as a result.

BRIEF DESCRIPTION OF THE DRAWING FIGS.

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 8 is a flowchart of an example of a process, according to aspects of the disclosure;

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Figure 1:
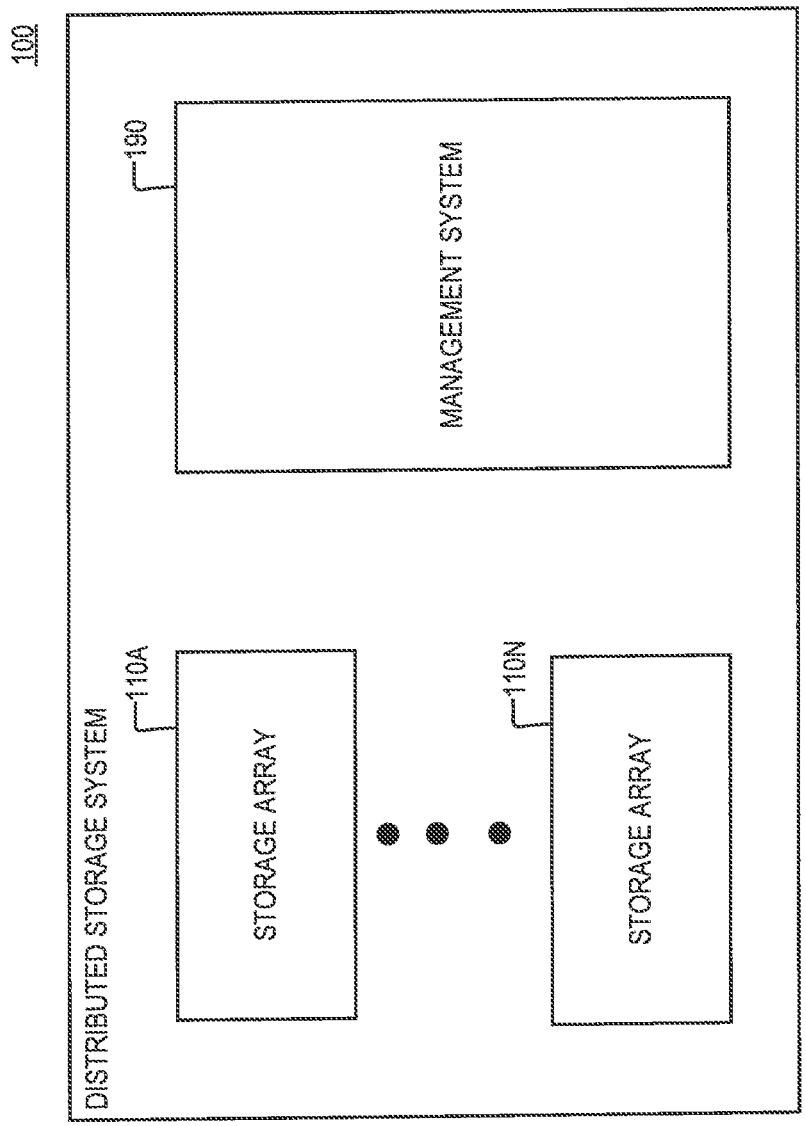
FIG. 1 is a diagram of an example of a distributed storage system, according to aspects of the disclosure.
Figure 2:
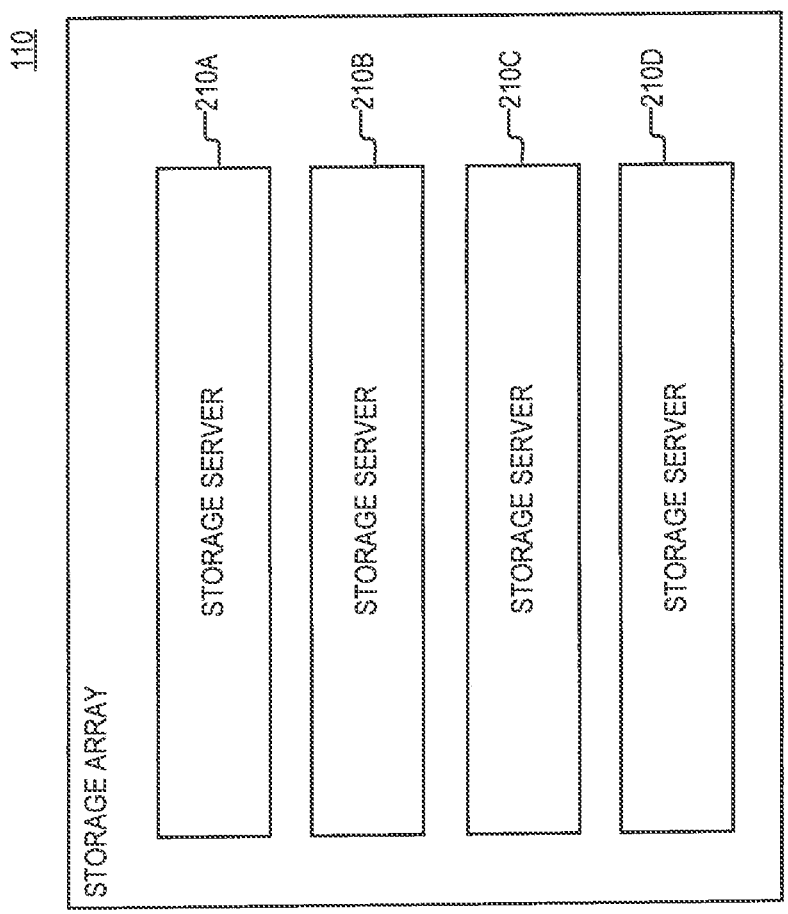
FIG. 2 is a diagram of an example of a storage array that is part of the storage system of FIG. 1, according to aspects of the disclosure.
Figure 3:
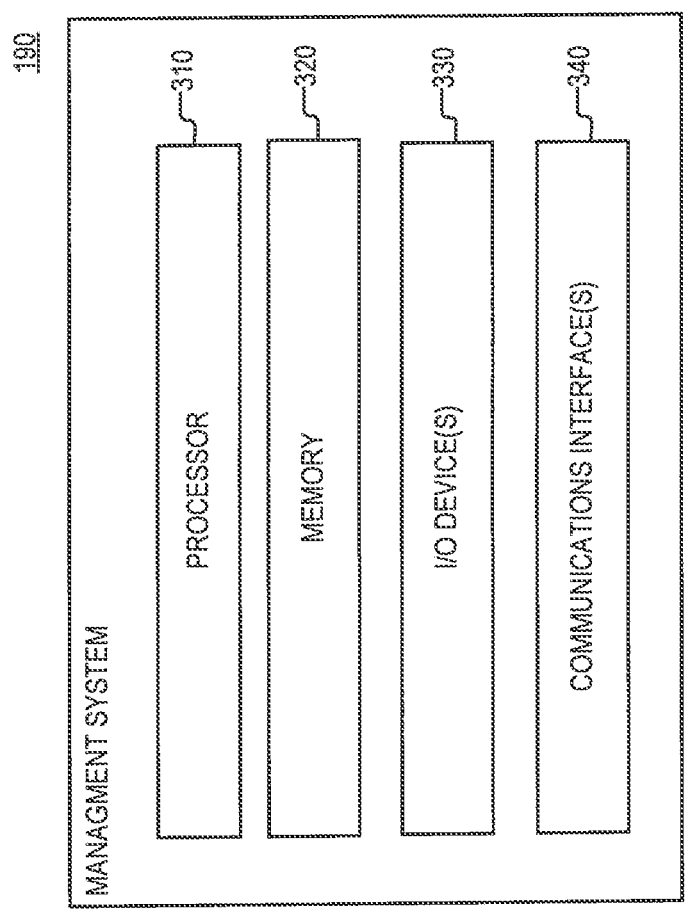
FIG. 3 is a diagram of an example of a management system that is part of the storage system of FIG. 1, according to aspects of the disclosure.

FIG. 1 is a diagram of an example of a storage system 100, according to aspects of the disclosure. The storage system 100 may include a content-based storage system and/or any other suitable type of distributed storage system. As illustrated, the storage system 100 may include one or more storage arrays 110 and a management system 190. The operation of the storage arrays 110 and the management system 190 is discussed further below with respect to FIGS. 2-8. FIG. 2 is a diagram a storage array 110 that is part of the storage system 100, according to aspects of the disclosure. The storage array 110 may include a plurality of storage servers 210 that are coupled to one another in a network (e.g., a mesh network). The network may include an InfiniBand network, a TCP/IP network, and/or any other suitable type of network. FIG. 3 is a diagram of an example of the management system 190, according to aspects of the disclosure. As illustrated, the management system 190 may include one or more processors 310, a memory 320, I/O device(s) 330, and communications interface(s) 340 that are operatively coupled to one another. The processor 310 may include any of one or more general-purpose processors (e.g., x86 processors, RISC processors, ARM-based processors, etc.), one or more Field Programmable Gate Arrays (FPGAs), one or more application specific circuits (ASICs), and/or any other suitable type of processing circuitry. The memory 320 may include any suitable type of volatile and/or non-volatile memory. In some implementations, the memory 320 may include one or more of a random-access memory (RAM), a dynamic random memory (DRAM), a flash memory, a hard drive (HD), a solid-state drive (SSD), a network accessible storage (NAS), and or any other suitable type of memory device. The I/O device(s) 330 may include any suitable type of input and/or output device, such as one or more mice, one or more keyboards, one or more microphones, or one more display screens, for example. The communications interface(s) 340 may include any suitable type of communications interface, such as one or more Ethernet adapters, one or more Wi-Fi adapters (e.g., 802.1414 adapters), and one or more Long-Term Evolution (LTE) adapters, for example.

Figure 4:
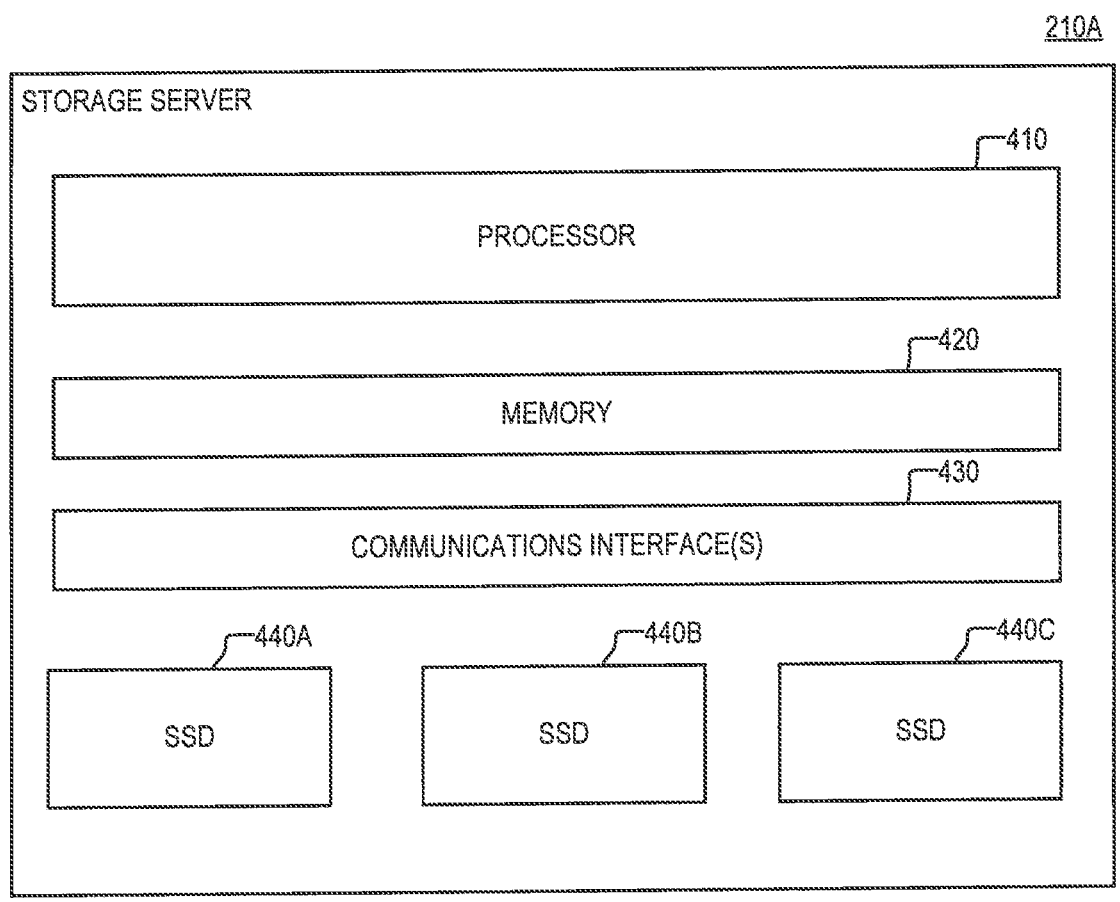
FIG. 4 is a diagram of an example of a storage server that is part of the storage system of FIG. 1, according to aspects of the disclosure.

FIG. 4 is a diagram of an example of the storage server 210A, according to aspects of the disclosure. As illustrated, the storage server 210 may include a processor 410, a memory 420, a communications interface(s) 430, and a plurality of storage devices that are operatively coupled to one another. The processor 410 may include any of one or more general-purpose processors (e.g., x86 processors, RISC processors, ARM-based processors, etc.), one or more Field Programmable Gate Arrays (FPGAs), one or more application specific circuits (ASICs), and/or any other suitable type of processing circuitry. The memory 420 may include any suitable type of volatile and/or non-volatile memory. in some implementations, the memory 320 may include one or more of a random-access memory (RAM), a dynamic random memory (DRAM), a flash memory, a hard drive (HD), a solid-state drive (SSD), a network accessible storage (NAS), and or any other suitable type of memory device. The communications interface(s) 430 may include any suitable type of communications interface, such as one or more Ethernet adapters, one or more Wi-Fi adapters (e.g. 802.1414 adapters), and one or more Long-Term Evolution (LTE) adapters, for example. In the present example, the storage devices 440 are solid state drives (SSD). However, alternative implementations are possible, in which at least one of the storage devices is a spinning hard disk (HD), a flash driver, a Read-Only Memory (ROM), a Random-Access Memory (RAM), and/or any other suitable type of volatile and non-volatile memory.

Figure 5:
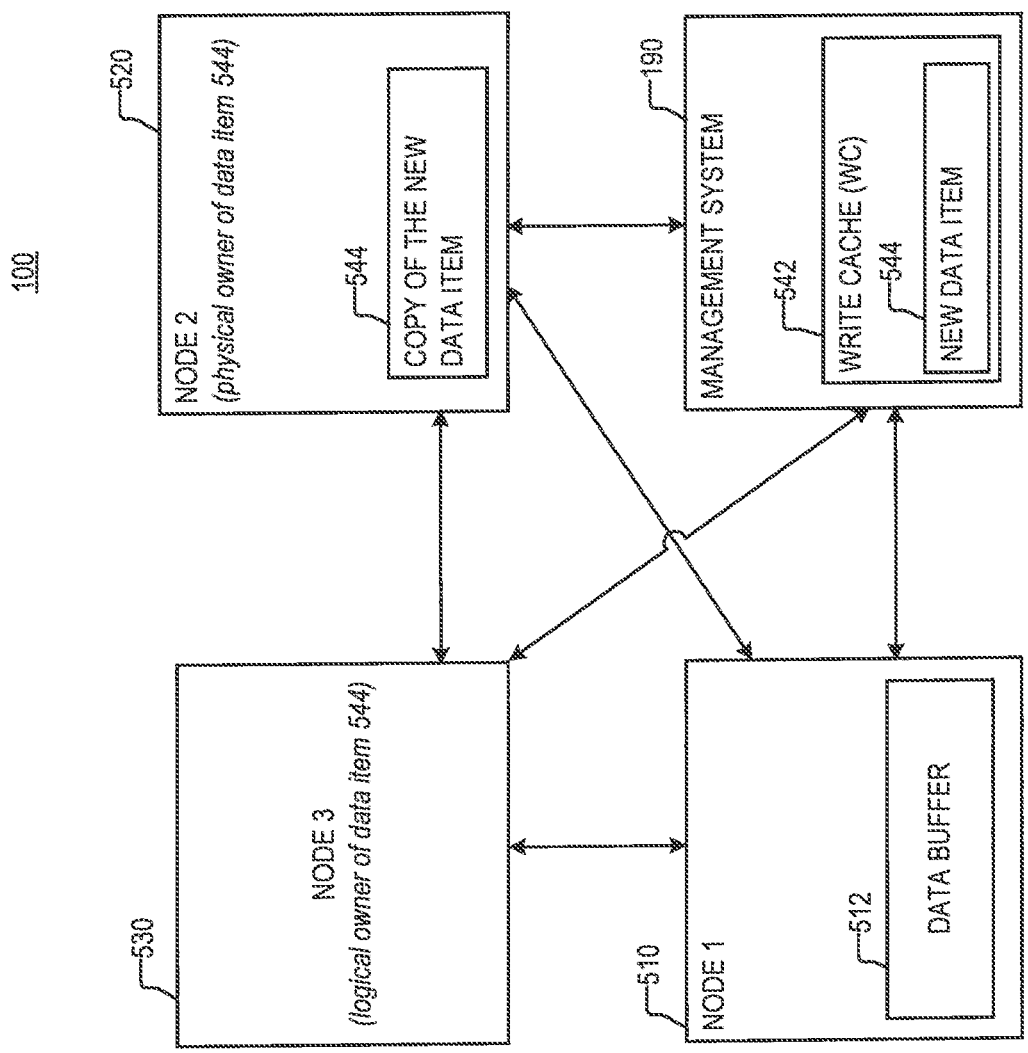
FIG. 5 is a diagram of an example of a storage system, according to aspects of the disclosure.

FIG. 5 is a schematic diagram illustrating aspects of the operation of the storage system 100, according to aspects of the disclosure. As illustrated, the system 100 may include a first node 510, a second node 520, a third node 530, and the management system 190. According to the present example, the first node 510, the second node 520, and the third node 530 may be connected to one another in a mesh network (e.g., an InfiniBand network). However, it will be understood that alternative implementations are possible in which any other suitable type of communications network is used. According to the present example, each of the first node 510, the second node 520, the third node 530 is implemented using a different one of the storage servers 210A-C. However, it will be understood that alternative implementations are possible in which any of the nodes 510-530 are implemented as different processes that are executed on the same storage server. Stated succinctly, the present disclosure is not limited to any specific implementation of the nodes 510-530.

The nodes 510-530 may be configured to communicate with one another via two principal mechanisms—namely, Remote Procedure Call (RFC) messaging and RDMA buffer transfers. When two nodes communicate via RPC messaging, one of the nodes may transmit to the other an RFC command, which when executed by the other node causes the other node to invoke a local software routine. By contrast, when two nodes communicate via Remote Direct Memory Access (RDMA) transfers, one of the nodes may use its network interface card (NIC) to initiate a buffer transfer from a region in the memory of the other node, without any software involvement. Because RDMA transfers are executed without software involvement, in some instances, they may constitute a more efficient method for transferring data than RPC messaging.

The storage system 100 may use a write cache (WC) component 542 that is backed by a WC Journal (not shown). The WC component 542 may be configured to handle write requests to the storage system 100 and store data items that are written to the system in (volatile) memory, backed by a persistent copy in the WC journal. The WC component 542 may further be configured to perform operations involving data items that are written to the storage system 100, such as destage operations in which data items stored in the WC component 542 are persisted to storage devices that are accessible to the nodes 510-530. Although in the present example the WC component 542 is implemented within the management system 190, it will he understood that alternative implementations are possible in which the WC component 542 may be implemented separately from the management system 190 (i.e., by using another computing device that is part of the storage system 100).

The storage system 100 may define at least two distinct ownerships for any data item that is cached in the WC component 542. Specifically, any of the data items stored in the WC component 542 may have a logical owner and a physical owner. The logical owner of any data item that is stored in the WC component 542 may be responsible for the operations performed on the data item, such as fulfilling read requests for the data item and orchestrating a destage flow for the data item. The physical owner of a data item may own the WC journal where the data item is persistently stored, and it may be responsible for keeping a copy of the data item in its physical memory. In some instances, the logical ownership and the physical ownership of a cached data item may be split between different nodes in the storage system 100.

According to the present example, a data item 544 may be stored in the WC component 542. The data item 544 may be 2 KB in size, and it may be an update to a buffer 512. Because the second node 520 is the physical owner of the data item 544, the second node 520 may store a copy of the data item 544 in its physical memory. The buffer 512 may be 16 KB in size, and it may be stored in the volatile memory (e.g., RAM) of the first node 510. In some implementations, the buffer 512 may hold the contents of a logical block (e.g., a page) that is stored in one of the storage devices (e.g., SSDs) of the storage system 100, and it can be used when the logical block is desired to be updated to include the contents of the data item 544. Specifically, the logical block may be updated by the first node 510 by performing the following actions:(i) loading the current content of the logical block into the buffer 512, (ii) receiving the contents of the data item 544 from its physical owner, (iii) overwriting at least a portion of the buffer 512 with the contents of the data item 544, and (iv) storing the resulting contents of the buffer 512 back into the logical block. In some respects, the process of storing the data item 544 into the logical block may also be referred to as destaging the data item 544. Although in the present example the data item 544 is smaller than the size of the logical block (e.g., 16 KB), alternative implementations are possible in Which the size of the data item 544 is equal to the size of the logical block.

The data item 544 may have split ownership: the logical owner of the data item 544 may be the third node 530, while the physical owner of the data item 544 may be the second node 520. The copy of the data item 544 may be created by a background process that is executed on the second node 520, which is responsible for transferring the contents of the data item 544 (and/or other data of Which the second node 520 is the physical owner) from the WC component 542 to the physical memory of the second node 520. As discussed further below with respect to FIG. 6, because the logical and physical ownership of the data item 544 is split between the nodes 520 and 530, there are situations in which the data item 544 may be corrupted when RDMA is used to transfer the contents of the data item 544 from its physical owner (e.g., the second node 520) to the first node 510.

Figure 6:
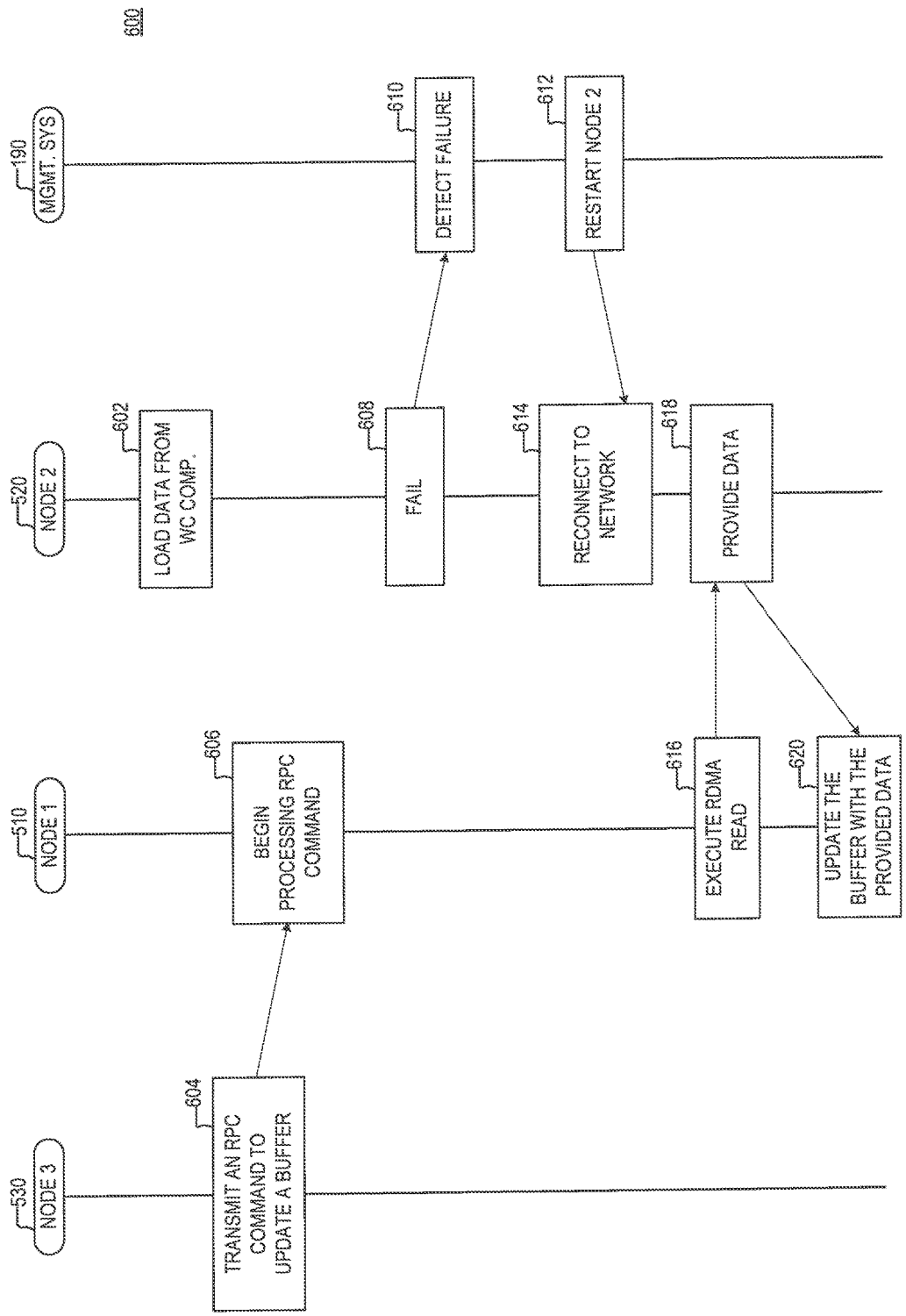
FIG. 6 is sequence diagram of an example of a process, according to aspects of the disclosure.

FIG. 6 is a sequence diagram of an example of a buffer update process 600 that is performed by the system 100, according to aspects of the disclosure. At step 602, the second node 520 executes a background process for loading cached data from the WC component 542. As a result of executing the background process, the contents of the data item 544, of which the second node 520 is the physical owner, is transferred from the WC component 542 into the memory of the second node 520. At step 604, the third node 530 transmits to the first node 510 an RPC command to update the buffer 512 to include the contents of the data item 544. At step 606, the first node 510 receives the RPC command and begins processing it. However, at step 608, before the first node 510 is able to execute an RDMA read and retrieve the data item 544 from the memory of the second node 520, the second node 520 fails. At step 610, the management system 190 detects the failure. At step 612, the management system 190 restarts the second node 520, At step 614, the second node 520 reconnects to the network connecting the second node 520 with the first node 510. At step 616, before the second node 520 has started the background process responsible for loading cached data, the first node 510 transmits an RDMA read request to the second node 520. At step 618, in response to the RDMA read request, the second node 520 provides to the first node 510 data that is stored at a memory location specified by the RDMA read request—i.e., a location in the memory (e.g., RAM) of the second node 520 where the contents of the data item 544 used to be stored prior to the second node 520 failing. At step 620, the first node 510 updates the buffer 512 to include the data item 544. As discussed above, updating the buffer 512 may include overwriting a portion of the data buffer with the contents of the data item 544. After the buffer 512 is updated, its contents may be stored in a storage device (e.g., an SSD) to replace older content that corresponds to the same logical block as the buffer 512.

According to aspects of the disclosure, the scenario described with respect to FIG. 6 results in a data inconsistency being introduced into the system 100. Because the RDMA read executed at step 616 is performed before executing the background process responsible for loading the contents of the data item 544 into the memory of the second node 520, the retrieved data may not include the contents of the data item 544 with which the buffer 512 is required to be updated. Thus, when the buffer is updated with the retrieved data, the data consistency of the system 100 may be compromised, which in turn could lead to incorrect operation of the system 100. Accordingly, the need exists for improved mechanisms for transferring of data, which are less likely to result in data inconsistencies being introduced when a node in the system 100 unexpectedly fails.

Figure 7A:
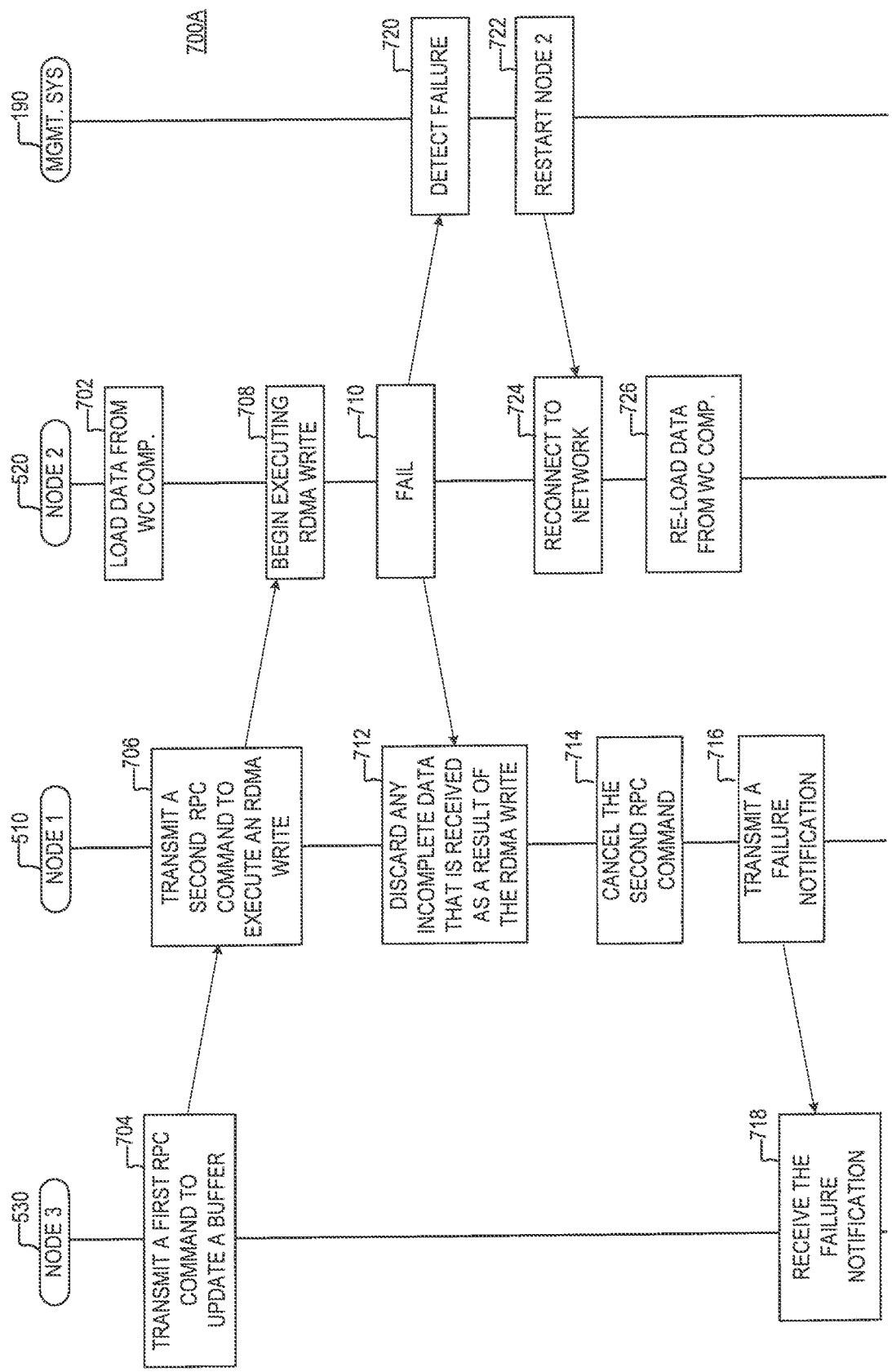
FIG. 7A is sequence diagram of an example of a process, according to aspects of the disclosure.

FIG. 7A is a sequence diagram of an example of a buffer update process 700A that is performed by the system 100, according to aspects of the disclosure. As is further discussed below, executing the process 700A results in the contents of the data item 544 being copied from the second node 520 into the buffer 512. The process 700A is advantageous over the process 600 because it is less likely to introduce data inconsistencies in the storage system 100 when the second node 520 fails. The process 700A. differs from the process 600 in that it does not rely on RDMA reads to transfer the contents of the data item 544. Rather, the process 700A adopts a two-step sequence in which the first node 510 transmits an RPC command to the second node 520 that causes the second node 520 to execute an RDMA write of the contents of the data item 544 into the memory of the first node 510 (e.g., directly into the buffer 512 or into another memory location). Because the second node 520 is configured to execute the RDMA write only after the contents of the data item 544 has been transferred into the memory of the second node 520, a failure of the second node 520 is unlikely to result in invalid data being written into the buffer 512 in place of the contents of the data item 544, when the second node 520 fails.

At step 702, the second node 520 executes a background process for loading cached data from the WC component 542. As a result of executing the background process, a copy of the data item 544 is loaded into the memory of the second node 520. At step 704, the third node 530 transmits to the first node 510 a first RPC command to update the buffer 512 to include the contents of the data item 544. At step 706, in response to the first RPC command, the first node 510 transmits to the second node a second RPC command instructing the second node 520 to execute an RDMA write of the contents of the data item 544 into the memory of the first node 510. At step 708, the second node 520 receives the second RPC command and begins executing an RDMA write. At step 710, before the RDMA write is completed, the second node 520 fails. At step 712, the first node detects that the RDMA write has been interrupted before its completion, and discards any data associated with the RDMA write that has been received so far. At step 714, the first node 510 cancels the second RPC command. At step 716, the first node 510 transmits, to the third node 530, a failure notification indicating that the first RPC command has failed to complete. At step 718, the third node 530 receives the failure notification. At step 720, the management system 190 detects that the second node 520 has failed. At step 722, the management system 190 restarts the second node 520. At step 724, the second node 520 reconnects to the communications network thereby re-establishing its connection with the first node 510 and the third node 530. At step 726, the second node 520 again executes the background process for loading cached data.

According to aspects of the disclosure, as a result of executing the background process, the contents of the data item 544, of which the second node 520 is the physical owner, is re-loaded into the memory of the second node 520. After the contents of the data item 544 is re-loaded into the memory of the second node 520, the third node 530 may retransmit the first RPC command. In response to receiving the re-transmitted first RPC command, the first node 510 may re-transmit the second RPC command to the second node 520. In response to receiving the re-transmitted second RPC command, the second node 520 may execute an RDMA write of the contents of the data item 544 into the memory of the first node 510, and the first node 510 may update the buffer 512 to include the contents of the data item 544. As discussed above, updating the buffer 512 may include overwriting a portion of the data buffer with the contents of the data item 544, After the buffer 512 is updated, its contents may be stored in a storage device e.g., an SSD) to replace older content that corresponds to the same logical block as the buffer 512.

Figure 7B:
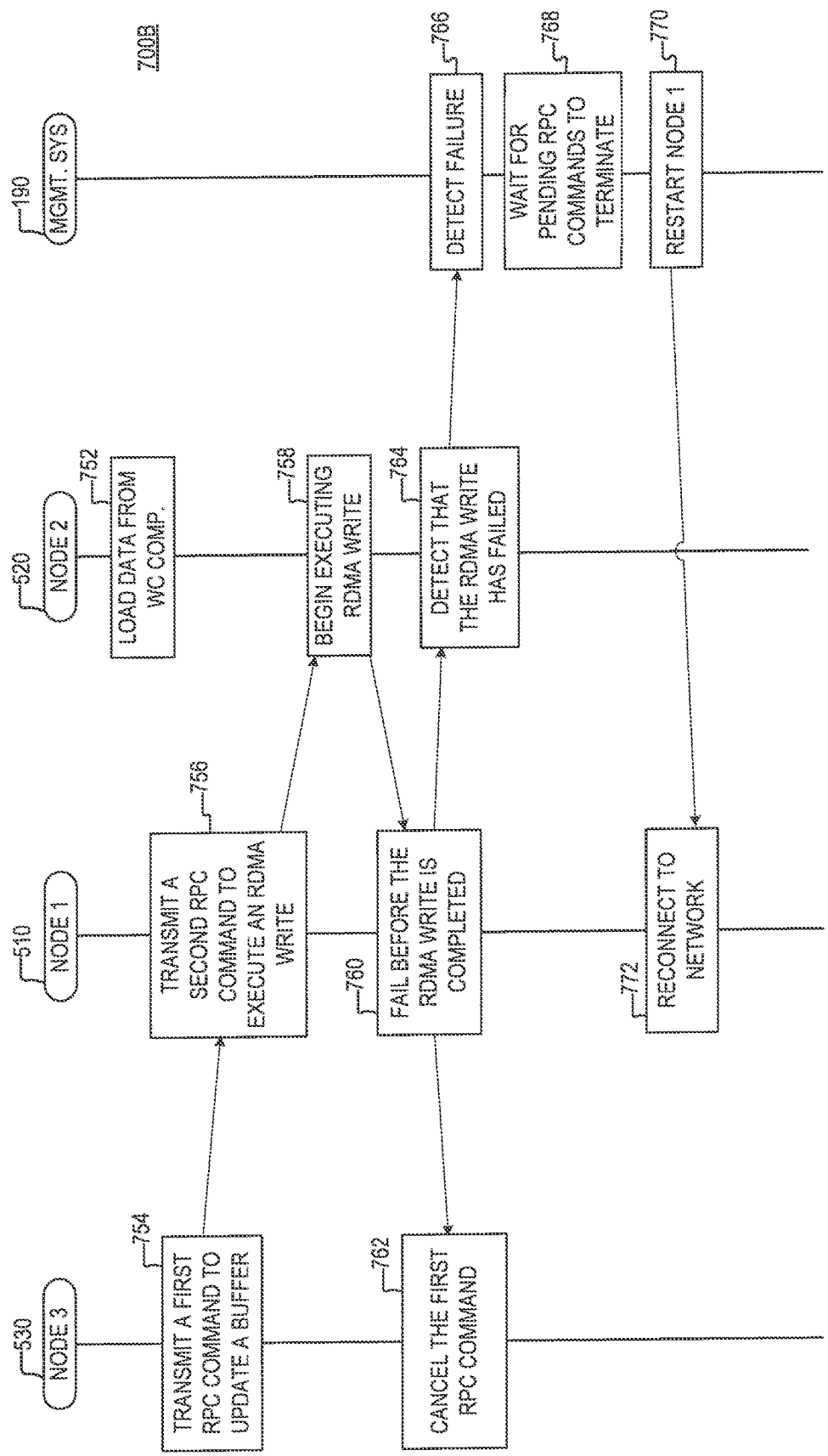
FIG. 7B is sequence diagram of an example of a process, according to aspects of the disclosure.

FIG. 7B is a sequence diagram of an example of a buffer update process 700B, according to aspects of the disclosure. As is further discussed below, executing the process 700B results in the contents of the data item 544 being copied from the second node 520 into the buffer 512. The process 700B is advantageous over the process 700A because is unlikely to introduce data inconsistencies in the storage system 100 when the first node 510 fails. The process 700B differs from the process 700A in that the management system waits for at least some (or all) inflight RPC commands initiated by the first node 510 to terminate, when the first node 510 fails, before restarting the first node. In some respects, waiting for all inflight RPC commands initiated by the first node 510 to terminate guarantees that any RDMA transfers that are triggered by the inflight RPC commands will fail before the memory of the first node 510 becomes again accessible to other nodes in the storage system. If the RDMA transfers were not to fail by the time the first node 510 is restarted, a recipient node of any of the RPC commands may execute an RDMA write to a location in the memory of the first node 510 where the recipient node was requested to execute the RDMA write before the first node 510 failing. However, following its restart, the first node 510 may no longer expect data to be written to that memory location, and may in fact use the same memory location to store data used for another purpose. Thus, if the first node 510 were restarted before an RPC command triggering an RDMA write is terminated, the RDMA write may be executed after the first node 510 is restarted, effectively corrupting valid data that is stored in the memory of the first node 510.

At step 752, the second node 520 executes a background process for loading cached data from the WC component 542. As a result of executing the background process, a copy of the data item 544 is loaded into the memory of the second node 520 At step 754, the third node 530 transmits to the first node 510 a first RPC command to update the buffer 512 to include the contents of the data item 544. At step 756, in response to the first RPC command, the first node 510 transmits to the second node 520 a second RPC command instructing the second node 520 execute an RDMA write of the contents of the data item 544 into the buffer 512. At step 758, the second node 520 receives the second RPC command and begins executing the RDMA write. At step 760, the first node 510 fails before the RDMA write is completed, and the RDMA. write fails as a result. At step 762, the third node 530 detects the failure of the first node 510 and cancels the first RPC command. At step 764, the second node 520 detects the failure of the RDMA write. At step 766, the management system. 190 detects the failure.

At step 768, the management system 190 waits until a set of inflight RPC commands that are issued within the system are terminated. In some implementations, the set may include all (or at least some) of the RPC commands that have been issued by the first node 510, which are currently pending. In operation, each of the nodes in the storage system 100 may maintain a respective reference count indicating the number of RPC commands it has received from the first node 510. Moreover, each of the nodes may be configured to notify the management system 190 when its reference count reaches zero. When any of the RPC commands issued by the first node 510 expires (i.e., due to a time out as a result of the first node 510 failing), the reference count maintained at the recipient node of the RPC command may be decremented. Thus, when all RPC commands issued by the first node expire (e.g., as a result of a time-out due to the first node failing), the reference counts maintained at the nodes in the storage system 100 will reach zero, and the nodes will transmit notifications to this effect to the management system 190. When the management system 190 has received such notifications from all (or a predetermined number of) nodes in the storage system 100, other than the first node 510. the management system 510 may determine that all RPC commands issued by the first node 510 have terminated.

At step 770, after the in-flight commands in the set have terminated, the management system 190 restarts the first node 510. At step 772, the first node 510 reconnects to the communications network thereby re-establishing its connection with the second node 520 and the third node 530. After the contents of the data item 544 is re-loaded into the memory of the second node 520, the third node 530 may retransmit the first RPC command. in response to receiving the re-transmitted first RPC command, the first node 510 may re-transmit the second RPC command to the second node 520. In response to receiving the re-transmitted second RPC command, the second node 520 may execute an RIMA write of the contents of the data item 544 into the memory of the first node 510, and the first node 510 may update the buffer 512 to include the data item 544. As discussed above, updating the buffer 512 may include overwriting a portion of the data buffer with the contents of the data item 544. After the buffer 512 is updated, its contents may be stored in a storage device (e.g., an SSD) to replace older content that corresponds to the same logical block as the buffer 512.

FIG. 8 is a flowchart of an example of a process 800, according to aspects of the disclosure. At step 802, a request is received at a node executing the process 800 (hereinafter "executing node") to load cached data into a buffer in the memory of one of the nodes in a storage system, In some implementations, the data may be the same or similar to the data item 544, the memory buffer may be the same or similar to the buffer 512, and storage system may be the same or similar to the storage system 100. In some implementations, the request may specify a destination of the data. The destination may be a location in the memory of the executing node or another node in the storage system According to the present example, the node in whose memory the data is desired to be stored is referred to as a "receiver" or "receiver node" of the data, At step 804, the executing node identifies the physical owner of the data. At step 806, the executing node determines if the physical owner of the data is part of the same RPC chain as the executing node. In some implementations, each RPC command that is sent within the storage system may contain metadata identifying the nodes that are in a chain associated with the RPC command. In this regard, the executing node may determine if the physical owner of the data is part of the same RPC chain as the executing node based on metadata contained in one or more RPC command received at the executing node. In instances in which the request received at step 802 includes an RPC command, the executing node may determine if the physical owner of the data is part of the same RPC chain as the executing node based on metadata contained within the request. If the data owner is part of the same RPC chain, the process 800 proceeds to step 808. Otherwise, if the data owner is not part of the same RPC chain, the process 800 proceeds to step 812, According to the present example, when the executing node is also the physical owner of the data, the physical owner and the executing node are considered to be part of the same RPC chain.

At step 808, an RPC connection is established between the node and the physical owner of the data. At step 810, after the RPC connection is established, an RPC command is sent to the physical owner of the data to perform an RDMA write of the data, in some implementations, the RPC command may identify a memory location in a node (other than the physical owner) where the data is desired to be stored. In response to receiving the RPC command, the physical owner of the data may execute the RDMA write and store the data at the identified location.

At step 812, the executing node determines whether it is the physical owner or receiver of the data. If the executing node is neither the physical owner nor receiver of the data, the process 800 proceeds to step 814. If the executing node is the receiver of the data, the process 800 proceeds to step 816. And if the executing node is the physical owner of the data, the process 800 proceeds to step 818. At step 814, when the executing node is neither the receiver nor the physical owner of the data, the executing node sends an RPC command to the physical owner of the data instructing the physical owner of the data to perform an RDMA write of the data into the memory of the receiver. At step 816, when the executing node is the receiver of the data, the executing node transfers the data into the memory of executing node by performing an RDMA read from the memory of the physical owner of the data. At step 818, when the executing node is the physical owner of the data, the executing node transfers to data into the memory of the receiver by executing an RDMA write.

The processes described with respect to FIGS. 6-8 are provided as an example only. At least some of the steps in any of the processes may he performed concurrently, in a different order, or altogether omitted. In some implementations, any of the processes discussed with respect to FIGS. 6-8 may be performed as part of a restaging flow of a storage system, which when executed causes cached data that has been recently written to the storage system to be persisted on one or more permanent storage devices (e. , SSDs). In this regard, the term "a first RPC command to update the buffer 512 to include the contents of the data item 544" may refer to any suitable instruction (e.g., a destage instruction), which at least in part causes cached data (e.g., the data item 544) to be stored in logical block of a storage device or an update buffer that is associated with the logical block. Similarly, the phrase "a request to load cached data into a buffer" may refer to any suitable instruction (a g., a destage instruction), which at least in part causes cached data to be transferred into a memory buffer that is allocated in one of the nodes in the storage system for the purposes of updating the contents of a logical block in at least one storage device (e.g., an SSD). Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and. B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers, Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible. implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition. of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard, The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims,

The invention claimed is:

1. A method for use in a distributed storage system having a write cache, the method comprising:
 receiving, by a first node in the distributed storage system, a first Remote Procedure Call (RPC) command to perform a partial update to a buffer that is stored in a memory of the first node, the partial update including replacing old data that is present in the buffer with new data that is stored in the write cache;
 transmitting, from the first node to a second node, a second RPC command instructing the second node to provide the new data to the first node by executing a Remote Direct Memory Access (RDMA) write operation into the memory of the first node; and
 transmitting, from the first node to the second node, a third RPC command instructing the second node to store the new data in the buffer by executing an RDMA write operation, the third RPC command being transmitted when the first node has failed before the second RPC command is completed,
 performing the partial update of the buffer based on the new data when the RDMA write operation is completed and the new data is received by the first node as a result;
 wherein the second node is a physical owner of a cache entry in the write cache that includes the new data, and the second node is configured to store a copy of the new data in a memory of the second node.

2. The method of claim 1, further comprising:
 detecting, by a management system, that the first node has failed;
 waiting, by the management system, until all pending RPC commands issued by the first node have terminated; and
 restarting, by the management system, the first node after all pending RPC commands issued by the first node have terminated.

3. The method of claim 1, further comprising:
 detecting that the first node has failed;
 waiting for the second RPC command to terminate as a result of the first node failing; and
 restarting the first node after the second RPC command has terminated.

4. A method for use in a distributed storage system having a write cache, the method comprising:
 receiving by a first node in the distributed storage system, a first Remote Procedure Call (RPC) command to perform a partial update to a buffer that is a stored in a memory of the first node, the partial update including replacing old data that is present in the buffer with new data that is stored in the write cache;
 when the second node is not part of an RPC chain including the first node transmitting, from the first node to a second node, a second RPC command instructing the second node to provide the new data to the first node by executing a Remote Direct Memory Access (RDMA) write operation into the memory of the first nod; and
 when the second node is part of the RPC chain, executing an RDMA read from the memory of the second node to retrieve the new data and performing a partial update of the buffer based on the new data,
 performing the partial update of the buffer based on the new data when the RDMA write operation is completed and the new data is received by the first node as a result;
 wherein the second node is a physical owner of a cache entry in the write cache that includes the new data, and the second node is configured to store a copy of the new data in a memory of the second node.

5. The method of claim 1, wherein the distributed storage system includes at least one storage device, the method further comprising storing contents of the buffer in a logical block of the storage device after the partial update is performed.

6. A distributed storage system comprising: a first node that is operatively coupled to a second node, wherein the first node is configured to perform the operations of:
   receiving a first Remote Procedure Call (RPC) command to perform a partial update to a buffer that is stored in a memory of the first node, the partial update including replacing old data that is present in the buffer with new data that is stored in a write cache of the distributed storage system;
   transmitting, to the second node, a second RPC command instructing the second node to provide the new data to the first node by executing a Remote Direct Memory Access (RDMA) write operation into the memory of the first node, the second node being a physical owner of a cache entry stored in the write cache that includes the new data, and the second node being configured to store a copy of the new data in a memory of the second node;
   transmitting, to the second node, a third RPC command instructing the second node to store the new data in the buffer by executing an RDMA write operation, the third RPC command being transmitted when the first node has failed before the second RPC command is completed; and
   performing the partial update of the buffer based on the new data when the RDMA write operation is completed and the new data is received by the first node as a result.

7. The distributed storage system of claim 6, further comprising a management system that is operatively coupled to the first node and the second node, wherein the management system is configured to perform the operations of:
   detecting that the first node has failed;
   waiting until all pending RPC commands issued by the first node have terminated; and
   restarting the first node after all pending RPC commands issued by the first node have terminated.

8. The distributed storage system of claim 6, further comprising a management system that is operatively coupled to the first node and the second node, wherein the management system is configured to perform the operations of:
   detecting that the first node has failed;
   waiting for the second RPC command to terminate as a result of the first node failing; and
   restarting the first node after the second RPC command has terminated.

9. A distributed storage system comprising: a first node that is operatively coupled to a second node, wherein the first node is configured to perform the operations of:
   receiving a first Remote Procedure Call (RPC) command to perform a partial update to a buffer that is stored in a memory of the first node, the partial update including replacing old data that is present in the buffer with new data that is stored in a write cache of the distributed storage system;
   when the second node is not part of an RPC chain including the first node, transmitting, to the second node, a second RPC command instructing the second node to provide the new data to the first node by executing a Remote Direct Memory Access (RDMA) write operation into the memory of the first node, the second node being a physical owner of a cache entry stored in the write cache that includes the new data, and the second node being configured to store a copy of the new data in a memory of the second node, wherein the second RPC command is transmitted to the second node when the second node is not part if an RPC chain including the first node; and
   when the second node is part of the RPC chain, executing an RDMA read from the memory of the second node to retrieve the new data and partially updating the buffer based on the new data; and
   performing the partial update of the buffer based on the new data when the RDMA write operation is completed and the new data is received by the first node as a result.

10. The distributed storage system of claim 6, wherein the distributed storage system includes at least one storage device, and the first node is configured to perform the operation of storing contents of the buffer in a logical block of the storage device after the partial update is performed.

11. A non-transitory computer readable medium storing one or more processor-executable instructions which when executed by one or more processors of a first node in a storage system cause the one or more processors to perform the operations of:
   receiving a first Remote Procedure Call (RPC) command to perform a partial update to a buffer that is stored in a memory of the first node, the partial update including replacing old data that is present in the buffer with new data that is stored in a write cache of the storage system;
   transmitting, to a second node in the storage system, a second RPC command instructing the second node to provide the new data to the first node by executing a Remote Direct Memory Access (RDMA) write operation into the memory of the first node, the second node being a physical owner of a cache entry stored in the write cache that includes the new data, and the second node being configured to store a copy of the new data in a memory of the second node;
   transmitting, to the second node, a third RPC command instructing the second node to store the new data in the buffer by executing an RDMA write operation, the third RPC command being transmitted when the first node has failed before the second RPC command is completed, and
   performing the partial update of the buffer based on the new data when the RDMA write operation is completed and the new data is received by the first node as a result.

12. A non-transitory computer readable medium storing one or more processor-executable instructions which when executed by one or more processors of a first node in a storage system cause the one or more processors to perform the operations of:
   receiving a first Remote Procedure Call (RPC) command to perform a partial update to a buffer that is stored in a memory of the first node, the partial update including replacing old data that is present in the buffer with new data that is stored in a write cache of the storage system;
   transmitting, to a second node in the storage system, a second RPC command instructing the second node to provide the new data to the first node by executing a Remote Direct Memory Access (RDMA) write operation into the memory of the first node, the second node being a physical owner of a cache entry stored in the write cache that includes the new data, and the second node being configured to store a copy of the new data in a memory of the second node, wherein the second RPC command is transmitted to the second node when the second node is not part of an RPC chain including the first node;

executing an RDMA read from the memory of the second node to retrieve the new data and partially updating the buffer based on the new data, the RDMA read being executed when the second node is part of the RPC chain; and performing the partial update of the buffer based on the new data when the RDMA write operation is completed and the new data is received by the first node as a result.

13. The non-transitory computer readable medium of claim 11, wherein the one or more processor-executable instructions, when executed by the one or more processors, further cause the one or more processors to perform the operation of storing contents of the buffer in a logical block of a storage device after the partial update is performed.

14. The non-transitory computer readable medium of claim 11, wherein the first RPC command is received from a third node in the storage system, the third node being a logical owner of the cache entry containing the new data.

\* \* \* \* \*